Patented Sept. 4, 1928.

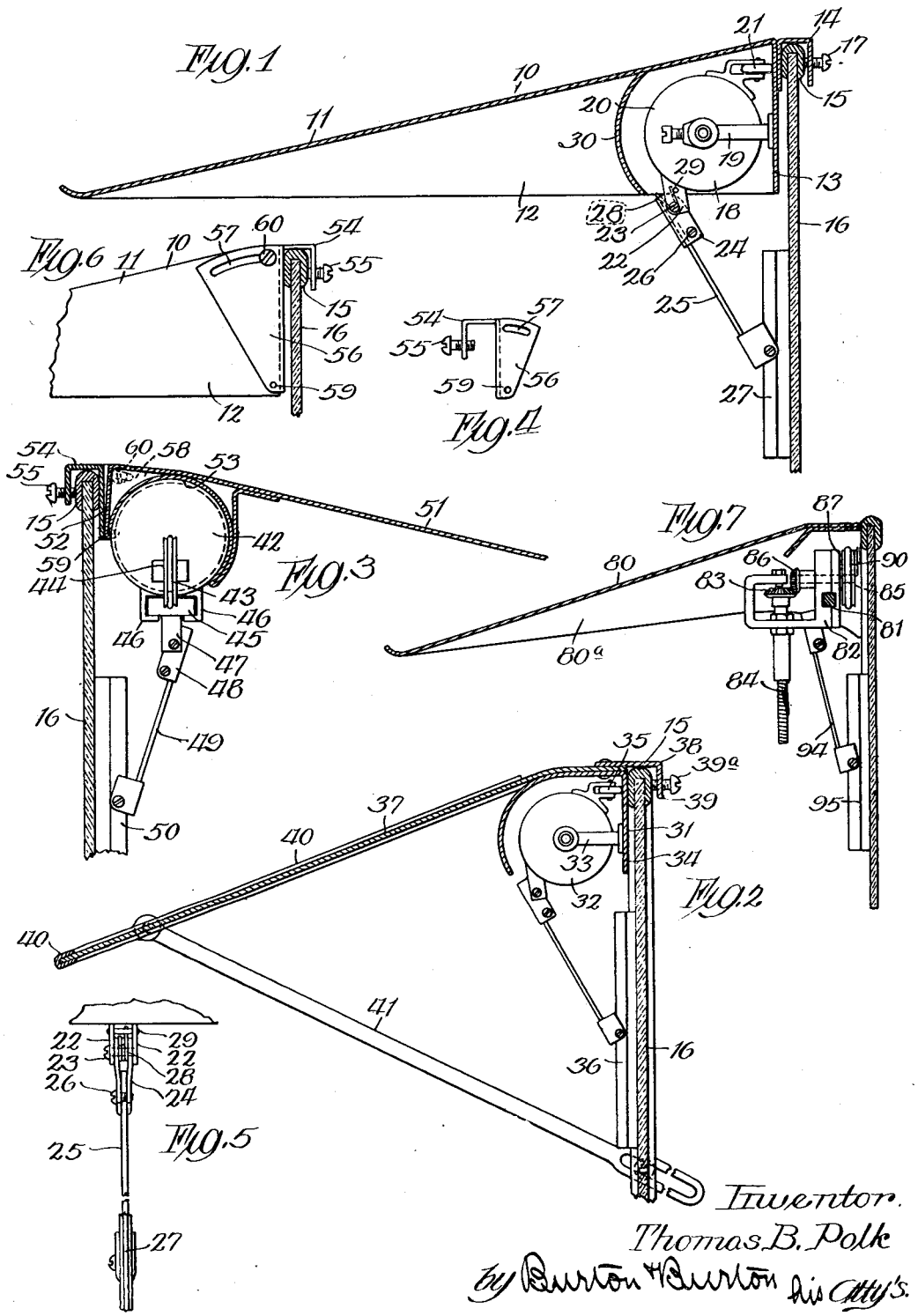

1,683,260

UNITED STATES PATENT OFFICE.

THOMAS B. POLK, OF SEATTLE, WASHINGTON, ASSIGNOR, BY MESNE ASSIGNMENTS, TO TRICO PRODUCTS CORPORATION, OF BUFFALO, NEW YORK.

COMBINED WINDSHIELD VISOR AND WIPER MOTOR.

Application filed January 26, 1924. Serial No. 688,894.

This invention contemplates a combined windshield cleaner and visor for motor vehicles, and the like, and further relates to means for mounting such combined structure on a windshield.

One object of the invention is to provide a combined structure of the character described which shall be attachable to, adjustable on, or detachable from a windshield as a unit.

Other objects and advantages of the invention will be apparent from the following description, taken in connection with the accompanying drawings, wherein several forms of the invention are illustrated.

In the drawings:

Fig. 1 is a fore-and-aft vertical sectional view of one form of the invention, and an adaptation of it to a windshield cleaner employing a fluid actuated motor having a reciprocating cylinder, the combined structure being shown operatively mounted on a windshield, and the visor being shown in fore-and-aft vertical section.

Fig. 2 is a view similar to Fig. 1 showing a slightly modified form of the construction shown therein.

Fig. 3 is a view similar to Figure 1 showing the invention and an adaptation of it to a cleaner employing a fluid motor having a stationary cylinder, the visor in this Figure being also shown in fore-and-aft vertical section, and the combined structure operatively mounted on a windshield.

Fig. 4 is a side elevation of the adjustable mounting or supporting bracket shown in Fig. 3.

Fig. 5 is a side elevation of the wiper arm and associated parts.

Fig. 6 is a detail fore-and-aft section through the windshield adjacent one end of the visor for showing a specific means of mounting the visor with a capacity for angular adjustment.

Fig. 7 is a rear view of another form of the invention showing a combined visor and cleaning apparatus, the latter being of the mechanically actuated type.

Referring more in detail to the drawings, and more particularly to the form of invention illustrated in Fig. 1 thereof, 10 designates a visor or sun shade, and comprises an outwardly extending shade portion 11 having depending side aprons 12 and a transverse back wall or apron 13. Welded or otherwise secured to the outer face of the rear apron 13 near the upper edge thereof is a channel or U-shaped bracket 14 designed to fit down over the upper bar 15 of the windshield 16, adjusting screws 17, or the like, being provided for fastening the same securely in position.

The automatic fluid actuated motor of the windshield cleaner is shown at 18 supported from the rear apron 13 of the visor by means of the outwardly projecting arms 19. The motor 18 is of the general type shown in prior U. S. patent to H. Hueber, No. 1,437,521 of December 5, 1922, and comprises a stationary valved piston (not shown), and a reciprocating outer cylinder 20. According to the present invention the latter carries one or more rollers 21 which track upon the inner surface of the apron 13 upon reciprocation of said cylinder.

Also carried by cylinder 20 and depending therefrom are a plurality of lugs 22. These lugs adjacent their lower ends carry a pin 23 upon which is pivoted a channel member 24. (See detail showing in Fig. 5.) Wiper arm 25, of a width to snugly fit between the walls of channel member 24 so that it may be adjusted with respect to said member and may be held in any of its adjusted positions by the clamping screw 26, is pivoted at its lower end to the wiper element 27, which latter engages the glass of the windshield 16 in the usual manner. A spring 28 is carried by the pivot pin 23 and the ends thereof project upwardly, one engaging the bottom wall of channel member 24 and the other engaging the transverse pin 29 carried by lugs 22, the action of the spring tending to maintain the wiper element 27 pressed firmly against the windshield at all times, as will be apparent. The resilient support for the wiper element, just described, renders the same in a large measure self-adjustable, and compensates for any irregularities which may be encountered in mounting the combined windshield cleaner and visor on windshields of various makes. It also enables the operator to make slight angular adjustments of the visor, for instance, without displacing the wiper or affecting its operativeness.

In order to house the motor 18, a partition 30 may be provided immediately in advance of said motor, this partition extending from one side apron 12 of the visor to the other, and from the lower edges of said aprons upwardly to the shade portion of the visor, as shown. The partition 30, together with the rear wall 13, forms a compartment or housing for the windshield cleaner motor, and from this housing projects forwardly, at a downward inclination, an extension constituting the shade portion of the visor. This partition is preferably curved to conform to the contour of the motor cylinder, and may either be a separate piece of material suitably secured in position or, if desired, may be formed as an integral part of the visor. The shade portion 11 of the visor 10 may be constructed of sheet metal, glass, leather, celluloid, or any other desired material.

Referring now more in detail to Fig. 2 of the drawings wherein a slightly modified form of the construction shown in Fig. 1 is illustrated, 31 designates an inverted housing in which is mounted the fluid motor 32 of the windshield cleaning apparatus, this motor being supported in the housing by means of outwardly extending arms 33 carried by the rear wall or apron 34 thereof in much the same manner as previously described in connection with Fig. 1. The motor 32 in this form of the invention is of the same type as above described, and carries one or more rollers 35 which track upon the apron 34. The wiper element in this figure bears reference character 36 and is supported from the cylinder of the motor in the same manner as previously described.

The housing 31 in this form of invention may be of integral construction, the front wall thereof being curved outwardly and downwardly, as shown. The visor is shown at 37, and is of celluloid, or some similar material, which is clamped along its upper edge between the supporting bracket 38 and the top wall of the housing 31, the bracket being anchored to the top wall at this point by means of rivets or other suitable fastening means. At its inner end the bracket is provided with a down-turned flange 39 which, with the rear wall or apron 34 of the housing, forms an inverted channel for the reception of the upper bar 15 of the windshield. Adjusting screws 39ª, or similar fastening devices, are provided for anchoring the combined structure securely in position. A channel frame member 40 receives the side and lower edges of the celluloid visor 37, and this frame is adjustably supported by means of side brackets 41, the adjustment being possible through the screw and slot arrangement at the inner ends of said brackets, the outer ends thereof being pivoted to the frame member to permit such adjustment.

In Fig. 3 of the drawings, a further modification of the invention is illustrated. The fluid motor shown in this form forms the subject-matter of my co-pending application filed January 26th, 1924, Serial No. 688,892, and will be referred to herein only in general terms, it being shown merely for purposes of illustration as in the previous forms. The main difference in so far as the present adaptation is concerned is that the cylinder 42 thereof is stationary and the piston (not shown) is movable. In other words, just the reverse of the motor previously described. Oppositely extending cables 43 are attached to opposite faces of the piston and extend over pulleys 44 at opposite ends of the cylinder and exteriorly thereof, and are attached to a slidable block 45 operating in guides 46 beneath the cylinder. Depending lugs 47 are carried by the block 46 corresponding to the lugs 22 described in connection with Fig. 1. These lugs support a channel member 48, wiper arm 49 and wiper element 50, all of substantially the same construction as previously described.

The visor is shown at 51, and is provided, as in the other forms of the invention, with a rear wall or apron 52, the latter in the present form being continued to form a semi-cylindrical groove 53 which receives cylinder 42 of the motor, the latter being firmly secured in this groove in any suitable manner so as to be supported by the visor.

The supporting bracket is shown at 54, and comprises an inverted U-shaped portion adapted to fit down over the upper bar of the windshield, and to be clamped securely thereto by means of the adjusting screws 55. This bracket carries forwardly projecting substantially triangular shaped plates 56 (see Fig. 4) slotted as at 57, and the visor at the sides thereof adjacent its rear wall is provided with gusset sections 58. Pivot pins 59 extend through the corresponding gusset sections 58 and plates 56 adjacent the lower ends thereof, and adjusting screws 60 are projected through slots 57 of plates 56 and engage screw threaded apertures in the gusset sections so that the visor may be adjusted to and secured in various angular positions with relation to the supporting bracket. The wiper element 50 is resiliently supported from the lugs 47 in the same manner as in the other forms of the invention described so that said element is maintained in operative engagement with the windshield despite slight movements of the motor when the visor is adjusted.

In Fig. 6 this adjustable bracket or mounting described in connection with the form shown in Fig. 3 is shown applied to the form of invention shown in Fig. 1. The construction and arrangement is the same as that described in connection with Fig. 3, and accordingly it is considered that detailed description thereof may be dispensed with.

It will be noted that in each form of the invention illustrated the visor supports the motor and associated parts and that these two elements are in turn supported as a unit on the windshield by means of a single bracket or mounting which is common to both, and, further, that the cleaner and visor by reason of this construction and arrangement may be bodily attached to, adjusted on, or detached from the windshield. The adjustments, after the combined structure has been mounted may be effected by the operator from the driver's seat without in any way affecting the operativeness of the wiper element. It will also be observed that in addition to supporting the motor, the visor also houses the same.

The fluid motors per se shown in the drawings form no part of the present invention and have merely been selected for purposes of illustration, it being apparent that any other type of motor might be substituted without departing from the spirit of the invention, or without materially altering the details of the combination.

In Fig. 7, wherein a mechanical form of cleaning apparatus is shown combined with a visor to form a unitary structure, the visor is designated as 80, and is provided with side-flanges 80ª for attachment to a windshield. A bar 81 extends from one side of the visor to the other and is supported thereby in any suitable manner. An arbor 82 is fixed to this bar near one end thereof and carries a bevel gear wheel 83 which may be connected by flexible shafting 84, or the like, to the drive shaft (not shown) of the vehicle. A driven shaft 85 also carried by the arbor 82 is provided with a bevel gear 86 which meshes with bevel gear 83 and at its other end said shaft 85 carries pulley 87. A second pulley (not shown) is attached to bar 81 at a distance spaced from the drive pulley 87 and a cable 90 extends over these pulleys. A carriage (not shown) is slidably mounted on bar 81 by means of the pivotal links (not shown), so that upon operation the carriage will reciprocate while the cable travels continuously in one direction, as will be readily understood. The wiper arm 94 and wiper element 95 are carried by and depend from the carriage.

It will be obvious to those skilled in the art that the improvements are susceptible of many other modifications and changes without departing from the spirit of the invention, and it is not therefore desired to limit or restrict the same except where limitations appear in the appended claims.

What I claim is:

1. In combination, a vehicle visor; a windshield cleaner motor supported thereby in housed relation and underneath the shade portion thereof; a windshield cleaner yieldably connected to said motor, and means for adjustably mounting the visor and motor as a unit upon a vehicle windshield for varying the field of vision through the latter while permitting the cleaner to remain in operative position with respect to the windshield.

2. In the construction defined in claim 1, the motor being of the fluid-actuated type comprising a reciprocable outer cylinder, the cleaner comprising a wiper and a wiper-actuating arm, the latter carried by said outer cylinder in its reciprocation; a spring reacting between said actuating arm and the wiper for stressing the latter toward the windshield, and a roller carried by the cylinder in position for bearing against a part of the visor and being stressed thereagainst by the same reaction of the spring which stresses the wiper against the windshield.

3. In the construction defined in claim 1, foregoing, the visor being hinged to the mounting means for angular adjustment of the shade portion in a vertical plane, the cleaner comprising a wiper having the actuating arm therefor carried by the motor, the wiper being hinged to the actuating arm, and a spring reacting between said arm and wiper for holding the wiper yieldingly against the windshield throughout the range of change of position of the motor in adjustment of the visor about its hinge pivot.

4. The combination of a bracket adapted to be attached to a windshield frame, a visor adjustably carried by said bracket, a wiper element adapted to engage the windshield, means carried by said visor for operating said wiper element, and means by which the wiper is maintained in operative relation to the windshield throughout the range of said adjustment of the visor.

5. In combination, a visor having a transverse rear wall and a transverse partition spaced forwardly from the rear wall and defining therewith a compartment, and a windshield cleaner motor supported by the visor and housed within the compartment, said visor and cleaner motor being attachable and detachable as well as being adjustable as a unit, said partition shielding and protecting the cleaner motor from any moisture which might be blown up under the forwardly extending portion of the visor.

6. In combination, a visor having a shade portion for extending forwardly and downwardly from its point of attachment on a vehicle, a transversely arranged partition depending from the shade portion between the forward and rearward transverse edges thereof, and a windshield cleaner motor mounted on the visor beneath the shade portion and behind the partition, the body lines of said motor being above the horizontal plane of the forward edge of the shade portion whereby no portion of the motor will extend into the field of vision as defined by the visor.

7. In combination, a visor having a shade portion for extending forwardly and downwardly from its point of attachment on a vehicle, a transversely arranged partition depending from the shade portion between the forward and rearward transverse edges thereof, and a windshield cleaner motor mounted on the visor beneath the shade portion and behind the partition, the lower edge portion of said partition being inclined rearwardly in a downward direction for directing the weather elements beneath the cleaner motor.

In testimony whereof, I have hereunto set my hand at Chicago, Illinois, this 14th day of January, 1924.

THOMAS B. POLK.